Oct. 25, 1960  L. H. DEMPSEY  2,957,267
FISH LINE SINKERS
Filed Jan. 12, 1959
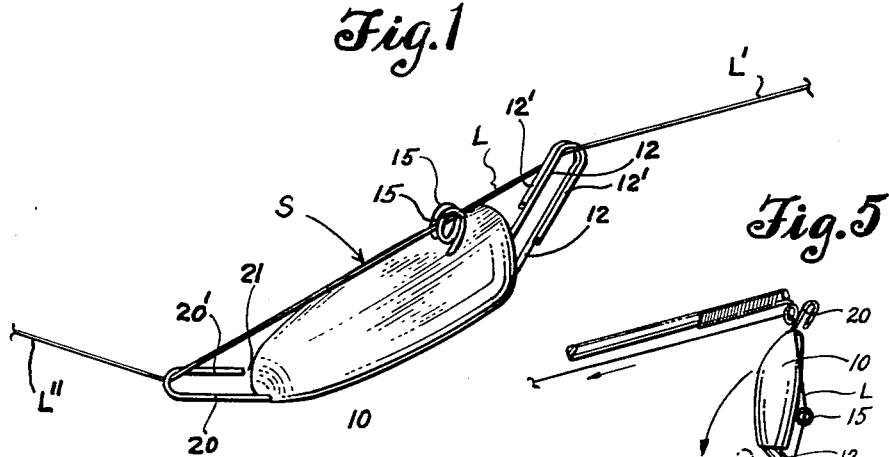
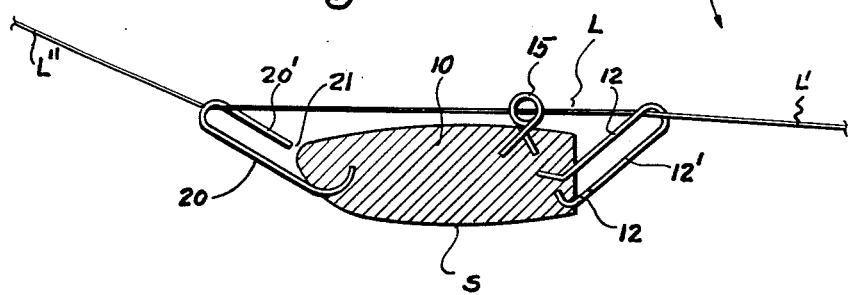
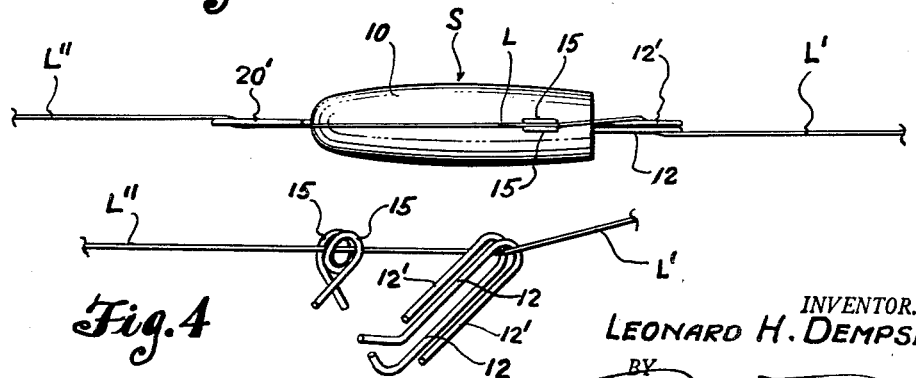
INVENTOR.
LEONARD H. DEMPSEY
BY
Robinson & Berry
ATTORNEYS

United States Patent Office 2,957,267
Patented Oct. 25, 1960

2,957,267

FISH LINE SINKERS

Leonard H. Dempsey, 22624 86th W., Edmonds, Wash.

Filed Jan. 12, 1959, Ser. No. 786,224

3 Claims. (Cl. 43—44.88)

This invention relates to fish line sinkers and it has reference more particularly to improvements in those types of sinkers which are sometimes designated as "slip sinkers.".

This application is a continuation-in-part of my co-pending application entitled Fishing Sinker, filed on December 19,1956 under Serial No. 629,395.

It is a common practice, especially in trolling for salmon, for the fisherman to change sinkers to get more or less weight in order to best suit changing fishing conditions. Therefore, it is quite advantageous that the sinkers used be so designed as to be easily and readily applied to or removed from the line. Also, in deep water trolling, the sinker is usually secured on the line a substantial distance from the lure or hook and it is advantageous in the reeling in of the line, especially after a fish has been hooked, that the sinker be automatically releasable to permit it to slide down the line to the lure so that it will not interfere with reeling in the fish up to the end of the pole.

It is the principal object of the present invention to provide a slip sinker that can be easily and readily applied to and secured on the line at any desired distance from the lure or hook and which will retain its position thereon under all normal trolling conditions but which can be automatically released, to allow it to slide on the line to the lure, by reeling in the line after the sinker has been engaged with the eye at the end of the fishing pole.

Other objects and advantages of the present invention are: to provide a fish line sinker that can be easily and readily applied to the line at any point without requiring that the line be threaded through any part of the sinker body; that is equipped with means whereby it can be releasably secured on the line against travel therealong under all normal trolling conditions but released by contact with the end of the pole; that cannot be accidentally displaced from the line at any time and which comprises a minimum of simple and relatively inexpensive parts.

Further objects and advantages of the invention reside in the details of construction of the various parts of the sinker; in their assembled relationship and in the mode of application and use of the sinker as will hereinafter be described.

In accomplishing the above mentioned and other objects of the invention, I have provided the improved details of construction, the preferred forms of which are illustrated in the accompanying drawings, wherein:

Fig. 1 is a perspective view of a fishing line sinker embodied by the present invention showing it as applied to a fishing line.

Fig. 2 is a longitudinal section of the sinker as applied and secured to the line for a trolling operation.

Fig. 3 is a top view of the sinker as applied to the line.

Fig. 4 is a perspective view showing the arrangement of wires as bent to form the line guiding and line gripping loops which are fixed to the forward end of the sinker body.

Fig. 5 is a view illustrating the automatic operation of releasing the sinker by reeling it into contact with the line guiding eye at the end of the fishing pole.

Referring more in detail to the drawings:

In the various views, the sinker is designated in its entirety by reference character S and the fishing line is designated by reference character L. As here shown, that portion of the line that extends from the sinker to the lure or hook is designated at L' and the part that leads from the sinker to the fishing pole, not shown, is designated at L".

The sinker S comprises a weight or body 10, of lead or other metal that is suitable for the purpose. This body, as here shown, is somewhat elongated and oval in vertical cross-section and it tapers slightly from a flat or blunt rearward end surface toward its rounded forward end portion. However, the specific shape of the body 10 might vary from the present showing within reasonable limits without departing from the spirit of the invention.

Projecting rearwardly and upwardly from the rear end of the body 10 to somewhat above the level of its top surface are two vertically spaced wires 12—12 of spring brass. These wires have their inner end portions embedded in and extend from the blunt rear end surface of the body 10 in substantially parallel relationship and each has its outer end portion 12' turned back to provide a hook-like portion. These two hook forming portions of the wires are disposed in registration, face to face, but are turned in opposite directions as clearly shown in Fig. 4, so that together the two wires as fixed in the body provide a closed loop through which the fish line can run freely and from which it cannot be accidentally removed. However, the fish line can be easily and readily placed within this loop or removed therefrom by springing the hook forming outer portions slightly apart for passage of the line between them. It has been shown that the ends of the back-turned portions 12' of the wires terminate short of the end surface of the body.

Fixed in and projecting upwardly from the body 10 near its rearward end is a pair of circular loops 15—15 of the same diameter. They are made from the same piece of spring wire which has its ends opposite end portions firmly embedded in the body 10. These two circular loops are in face to face contact, and are located in the vertical axial plane of the body 10. They may be sprung apart to permit the fish line to be drawn into the space between them as shown where, by reason of the resiliency of the wire from which the loops are formed, the line will be gripped and held and the sinker thus retained from travel along the line.

Fixed rigidly in and extending upwardly and forwardly from the forward end portion of the weight body is a wire 20 which has its outer end portion 20' bent back to extend substantially parallel with and vertically spaced from the anchored end portion thus to provide a deep and round seated hook. The back-turned end portion 20' of the wire terminates short of the near end of the body leaving a space between them, as at 21, through which the fishing line can pass to seat it in or remove it from the hook.

Assuming that the sinker has been so provided, a suitable mode of application to the fish line is as follows: The sinker body 10 is held in the hand, preferably in a horizontal position and the line L is passed down between the outer ends of wires 12—12 and beyond the ends of the back-turned portions 12'—12'. The sinker is then rotated to cause the line to extend transversely through the reeveway as provided by the coacting wires. Then the line is shifted outwardly to the position therein in which it is seen in the several views in the drawings. Next, the line is drawn between the paired circular loops 15—15 where it will be held by the inward pressure of the loops against it. Finally the line is passed through the space 21 and drawn into the rounded base end or seat provided by the wire 20. As so applied to the line, the sinker will be suspended therefrom during trolling as in Fig. 1, and will be held against travel at the selected distance from the lure or hook. This is the normal position of the sinker during a trolling operation and it may be a substantial distance from the lure or hook at the end of the line.

When the line is reeled in from a trolling operation, the forward end portion of the wire 20 as extended from the sinker body 10 will ultimately engage the line guiding eyelet at the end of the fishing pole, as shown in Fig. 5. After this, a continuing pull on the line by the reel will disengage the hook 20 from the line and that end of the sinker body will drop. Additional reeling pull on the line will then free it from between the loops 15—15 and the sinker, then supported only by the wires 12—12, will slide freely along the line to the lure, permitting the full length of line to be wound in to the end of the pole.

It is noted particularly by reference to Fig. 2 that the closed outer ends of the line guiding wire assemblies, at the forward and rearward ends of the sinker body 10, are substantially at the level of the loops 20—20, therefrom, there is no tendency for the line to be pulled out from the loops 15—15 by the ordinary trolling pull on the line. However, as soon as the line is free from hook 20, the pull as effected by the reel will readily displace it from the loops 15—15.

Sinkers of this kind can be made in various sizes, and changes in shape of the sinker body can be made within reasonable limits without change in the mode of use or operation of the same.

What I claim as new is:

1. In combination, a fish line and a fishing sinker adapted to be releasably connected to the fish line, said sinker comprising an elongated body having forward and rearward end portions, forward end supporting means comprising a wire, one end of said wire being fixed in said body, said wire extending forwardly and upwardly above the body and including a back-turned portion providing a seat engageable with the fish line for supporting the forward end of the body and the free end of said wire being spaced from said body, a closed loop formed of wire secured to the rearward end of said body and directed rearwardly and upwardly above said body, the end of the loop spaced from the body providing a seat engageable with the fish line, and spring means on said body in a line between the uppermost portions of said wire and said loop, engageable with the fish line to releasably retain the sinker in position on the fish line and whereby the fish line is in substantially a straight line and a pull on the fish line will not release the fish line from said spring means.

2. A combination as in claim 1 wherein said closed loop comprises two wires, one end of each wire being fixed in said body and said wires extending from the body in spaced relationship and each being bent intermediate its free end to form curved portions registered face-to-face and the free end of each wire extending toward said body.

3. A combination according to claim 1 wherein said spring means for preventing sliding of the sinker along the line comprises a length of spring wire rigidly embedded at its ends in said body and formed between its ends into a pair of circular loops, registered face-to-face in the longitudinal plane of the sinker body.

References Cited in the file of this patent

UNITED STATES PATENTS

| | | |
|---|---|---|
| 813,153 | Johnson | Feb. 20, 1906 |
| 1,848,600 | Best | Mar. 8, 1932 |
| 2,482,343 | Ingleton | Sept. 20, 1949 |

FOREIGN PATENTS

| | | |
|---|---|---|
| 690,469 | Great Britain | Apr. 22, 1953 |